United States Patent
Wordsworth et al.

(10) Patent No.: US 9,011,023 B2
(45) Date of Patent: Apr. 21, 2015

(54) INSTALLATION FOR CONVEYING ELECTRICAL SIGNALS BETWEEN A FIRST TRIAXIAL CABLE AND A SECOND TRIAXIAL CABLE

(75) Inventors: Gary Wordsworth, Stoke Poges (GB); Keith Jenkins, Cookham (GB); Philip Longhurst, Ringmer (GB); Christopher Hamblin, Worthing (GB); Gareth Foster, Worthing (GB)

(73) Assignee: Interlemo Holding S.A., Ecublens (CH)

( * ) Notice: Subject to any disclaimer, the term of this patent is extended or adjusted under 35 U.S.C. 154(b) by 175 days.

(21) Appl. No.: 13/814,650

(22) PCT Filed: Sep. 7, 2011

(86) PCT No.: PCT/IB2011/053906
§ 371 (c)(1),
(2), (4) Date: Feb. 6, 2013

(87) PCT Pub. No.: WO2012/032474
PCT Pub. Date: Mar. 15, 2012

(65) Prior Publication Data
US 2013/0162845 A1 Jun. 27, 2013

(30) Foreign Application Priority Data
Sep. 8, 2010 (EP) .................................. 10175822

(51) Int. Cl.
*G02B 6/42* (2006.01)
(Continued)

(52) U.S. Cl.
CPC ........... *H04N 5/23203* (2013.01); *H04B 10/40* (2013.01); *H04N 5/222* (2013.01); *H04N 5/232* (2013.01); *H04B 10/25751* (2013.01)

(58) Field of Classification Search
CPC ........................... G02B 6/4246; H04B 10/2503
USPC ......................................................... 398/194
See application file for complete search history.

(56) References Cited

U.S. PATENT DOCUMENTS

| 5,150,442 A | 9/1992 | Desmons |
| 2003/0112338 A1 | 6/2003 | Pelletier et al. |
| 2010/0172648 A1* | 7/2010 | Longhurst et al. ............. 398/82 |

FOREIGN PATENT DOCUMENTS

| EP | 1 758 280 A | 2/2007 |
| JP | 2000-059654 A | 2/2000 |

OTHER PUBLICATIONS

Search Report issued by European Patent Office for priority application EP 10 17 5822 dated Feb. 22, 2011.
(Continued)

*Primary Examiner* — Jerry Rahll
(74) *Attorney, Agent, or Firm* — Frommer Lawrence & Haug LLP; Ronald R. Santucci

(57) ABSTRACT

The present invention relates to an improved installation for conveying electrical signals carried by a first triaxial cable (2) to a second triaxial cable (6) and vice versa. It comprises: a first interface (3) between the first triaxial cable (2) and a fiber optic cable (4) and a second interface (5) between the fiber optic cable (4) and the second triaxial cable (6). A television camera (7) is connected to a remote camera control unit (1) via this installation. The first triaxial cable (2) connects the camera control unit (1) with the first interface (3). The first interface (3) comprises a first adapter converting electrical signals, conveyed by the first triaxial cable (2), to optical signals. The fiber optic cable (4) transmits optical signals to the second interface (5). The second interface (5) comprises a second adapter converting optical signals to electrical signals. The second triaxial cable (6) transmits the electrical signals to the television camera (7). A mirror image of the adapters allows transmitting electrical signals from the camera (7) to the camera control unit (1). The interfaces comprise A/D converters and D/A converters respectively adapted to convert analog signals from the triaxial cable into digital optical signal to be launched into the fiber and digital optical signals into analog electrical signals.

8 Claims, 6 Drawing Sheets

(51) Int. Cl.
*H04B 10/25* (2013.01)
*H04B 10/516* (2013.01)
*H04B 10/69* (2013.01)
*H04N 5/232* (2006.01)
*H04B 10/40* (2013.01)
*H04N 5/222* (2006.01)
*H04B 10/2575* (2013.01)

(56) References Cited

OTHER PUBLICATIONS

Notification of Reason(s) for Rejection issued by Japanese Patent Office for corresponding Japanese application 2013-527722 dated Jan. 20, 2015.

* cited by examiner

INSTALLATION FOR CONVEYING ELECTRICAL SIGNALS BETWEEN A FIRST TRIAXIAL CABLE AND A SECOND TRIAXIAL CABLE

This application is a 371 of PCT/IB2011/053906 filed on Sep. 7, 2011, published on Mar. 15, 2012 under publication number WO 2012/032474 A, which claims priority benefits to European Patent Application 10175822.5 filed Sep. 8, 2010, the entire disclosure of which is incorporated herein by reference.

The present invention relates to an installation for conveying electrical signals between a first triaxial cable connected to a camera control unit and a second triaxial cable connected to a camera. The installation according to the invention comprises a first interface, configured to be connectable between the first triaxial cable and a fibre optic cable comprising one or more optical fibres, and a second interface, configured to be connectable between the fibre optic cable and the second triaxial cable, said first interface comprising a first and a fourth adapter and said second interface comprising a second and a third adapter.

Such an installation is useful for conveying video, audio, and control data to and from a television camera. In many television recording situations the camera is remote from the camera control unit and the recording device. The camera may be on a studio floor while the control unit and recording device or vision mixing equipment is in a different room. During outside broadcasts the control unit is often in a van remote from where a scene is being played out. At some sports events, for example race tracks, there is a requirement for the camera to be a considerable distance from the broadcast room or the outside broadcast van. Video, audio, intercom, control and other data are sent to and from the camera. For example, the program video may be sent from the camera while viewfinder video is sent back.

Many manufacturers make thus cameras and control units connected by a triaxial cable. These cables suffer however increasing signal degradation with the cable length. Therefore, other manufacturers use fibre optic links which can cover greater ranges.

In addition to this, the prior art discloses also apparatuses which can be used to convert the electrical signals conveyed on a triaxial cable to optical signals to be transmitted via a fibre optic cable. Similarly there exist apparatuses that can be used to convert optical signals conveyed on a fibre optic cable to electrical signals to be transmitted on a triaxial cable. In such apparatuses, individual analogue signals are demodulated in a converter but this requires a significant part of the converter circuitry to be designed specifically for one model of camera control unit. Moreover, the optical signals are produced by analogue modulation which causes signal degradation. Despite the high bandwidth and low loss of optical cables the degradation increases with the length of the fibre.

Moreover, when the triaxial cable carries signals both to and from the camera on a single wire, the signals travelling in each direction need to be separated to prevent echoes.

Furthermore, another problem is that triaxial links for High Definition (HD) television have to carry wider bandwidth HD signals which means that higher frequencies are sent over the triax.

The present invention proposes to improve the prior art apparatus and allow High Definition signals to be carried. The present invention also proposes to improve the prior art apparatus and allow Standard Definition signals to be carried with greater fidelity.

The advantages of installation according to the present invention are the following:

High Definition television or other high frequency signals may be carried with the same performance, or better than Standard Definition signals were carried by the prior art. Echoes, ghosts and ringing are reduced or imperceptible.

Moreover, the present invention allows that once the signal has been converted to digital there is no further significant degradation until the signal is converted back to analogue. The signal quality does not degrade when longer optical cables are used unless the maximum operating range is exceeded. The digital signal is not subject to degradation due to temperature drift or aging of the digital components.

The invention makes also use of one or more digital filters to further reduce the bandwidth of one of the digital representations of the filtered versions of the electrical signal and to attenuate the frequencies corresponding to the signals that are intended to travel from the camera to the camera control unit. Similarly, digital filters can also be used to attenuate the frequencies corresponding to the signals that are intended to travel from the camera control unit to the camera.

The advantages of digital filters are well known to those skilled in the art. They are more reproducible and lower cost than similar performance analogue filters. They can be designed to be linear phase giving very low pulse distortion. They do not suffer from temperature drift.

The present invention allows also to remove the need to isolate or demodulate each of the electrical signals in order to reduce the extent to which the circuit needs to be customised for each of the camera control units with which it is to be used. For example many camera links have a cluster of very narrow bandwidth signals at lower frequencies. Demodulating or separating these signals with filters requires individual circuits or filters for each signal but these are at frequencies at which a directional combiner/splitter works well and this does not require individual digital filters or ADCs/DACs.

The present invention allows also to select digital filters corresponding to the camera and CCU in use.

This is an electrical selection—a program—and does not involve changing any circuit boards.

An installation according to the invention allows obtaining lightweight devices especially for camera and adapters close to the camera as it is not necessary to provide for batteries or other power supply.

According to the invention, an installation for conveying electrical signals between a first triaxial cable connected to a camera control unit and a second triaxial cable connected to a camera comprises a first interface, configured to be connectable between the first triaxial cable and a fibre optic cable comprising one or more optical fibres, and a second interface, configured to be connectable between the fibre optic cable and the second triaxial cable, said first interface comprising a first and a fourth adapter, said second interface comprising a second and a third adapter, said first and said third adapters comprising
a directional combiner/splitter,
one or more low pass anti-alias filters,
one or more analogue to digital converter circuits, each connected to one of the low pass anti-alias filters,
one or more digital coding circuits, each connected to one of the analogue to digital converter circuits,
one or more first optical transducers, each connected to the digital coding circuits,
said second and said fourth adapters comprising
one or more second optical transducers, one or more digital decoding circuits, each connected to one of the second optical transducers, one or more digital to analogue converter circuits, each connected to one of the digital decoding circuits, one or more low-pass filters, each connected to one of the digital to analogue converter circuit, said first adapter comprising one or more first digital filters, each connected between one of the analogue to digital converter circuits and one of the digital coding circuits, said first digital filters being configured to block or attenuate frequency ranges that correspond to frequency ranges of signals transmitted from the camera to the camera control unit and to pass frequency ranges that correspond to frequency ranges of signals transmitted from the camera control unit to the camera, or said second adapter comprising one or more second digital filters, each connected between one of the digital decoding circuits and one of the digital to analogue converter circuits, said second digital filters being configured to block or attenuate frequency ranges that correspond to frequency ranges of signals transmitted from the camera to the camera control unit and to pass frequency ranges that correspond to frequency ranges of signals transmitted from the camera control unit to the camera, or said third adapter comprising one or more third digital filters, each connected between one of the analogue to digital converter circuits and one of the digital coding circuits, said third digital filters being configured to block or attenuate frequency ranges that correspond to frequency ranges of signals transmitted from the camera control unit to the camera and to pass frequency ranges that correspond to frequency ranges of signals transmitted from the camera to the camera control unit, or said fourth adapter comprises one or more fourth digital filters, each connected between one of the digital decoding circuits and one of the digital to analogue converter circuits, said fourth digital filters being configured to block or attenuate frequency ranges that correspond to frequency ranges of signals transmitted from the camera control unit to the camera and to pass frequency ranges that correspond to frequency ranges of signals transmitted from the camera to the camera control unit.

According to the invention, the second and the fourth adapter can comprise a summing circuit connected to the low-pass filters.

According to the invention, the first and the third adapters can comprise an optical combiner to sum the optical signals output by the first optical transducers.

According to the invention, the second and the fourth adapters can comprise a wavelength division multiplexer able to split a combined optical signal into several independent optical signals to be transmitted by the second optical transducers.

According to the invention, the first and second adapters can be each provided with a power diplexer.

According to the invention, the first and fourth adapters respectively the second and the third adapters can comprise a wavelength division multiplexer or directional coupler.

According to the invention, the first and fourth adapters respectively the second and the third adapters can be enclosed in two different housings provided with input and output ends connectable to the triaxial and fibre optic cables.

According to the invention, the characteristics of the first, second, third and fourth digital filters (12, 19) can be adjustable.

According to another embodiment of the invention, the installation can comprise an automatic calibration circuit designed to adjust the amplitude of one or more of the analogue to digital converters to compensate for imbalances in the gains of the anti-alias filters, analogue to digital converters or their associated circuitry including drivers amplifiers and buffers. This reduces the need for manual adjustment during manufacturing and subsequent drift due to temperature and aging.

According to another embodiment of the invention, the fibre optic cable can be a hybrid cable, comprising two fibres optic and copper conductors, and the first adapter can be provided with a power diplexer fed by the first triaxial cable and designed to allow DC or AC power to flow to copper conductors for power supplying devices located at the distal end of the hybrid cable and/or of distal end of the second triaxial cable.

The foregoing and other features and advantages of the invention will be apparent from the following description of the preferred embodiments of the invention, as illustrated in the accompanying drawings.

Figure 4A:
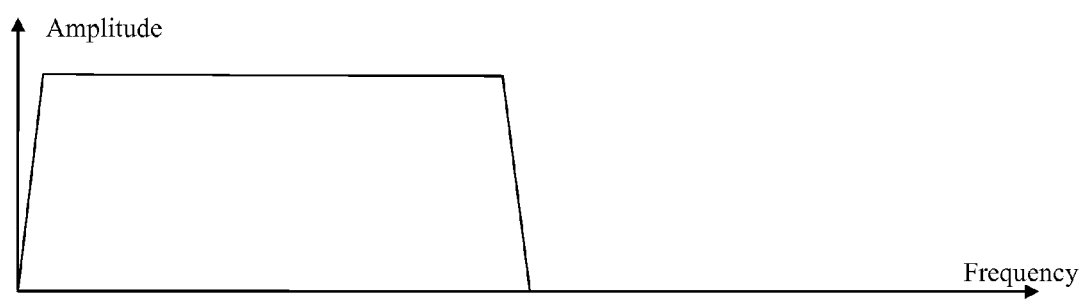
FIG. 4*a* shows the frequency response of digital filters used in the path from that camera to the camera control unit.
Figure 4B:
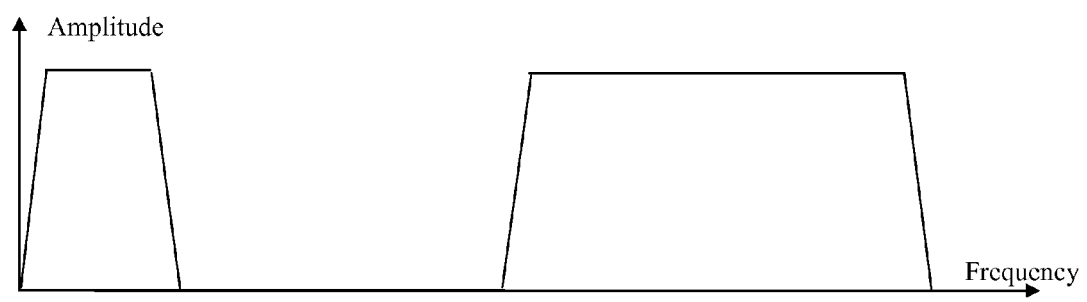

FIG. 4*b* shows the frequency response of the digital filters used in the path from the camera control unit to that camera.

Figure 5:
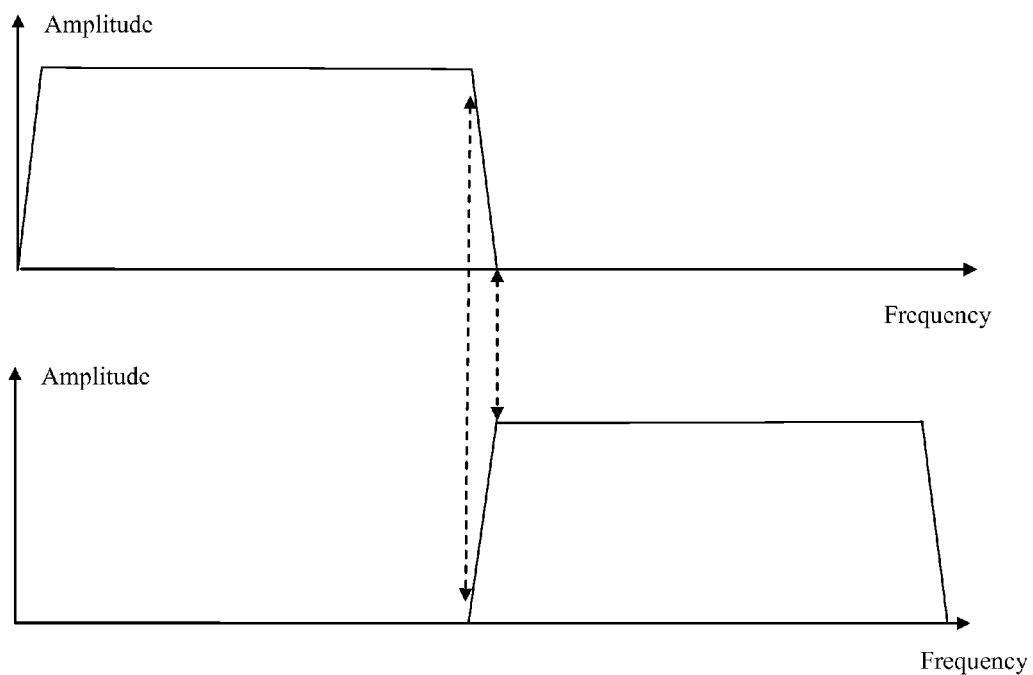

FIG. 5 shows the frequency response of the second pair of complementary filters.

Figure 6:
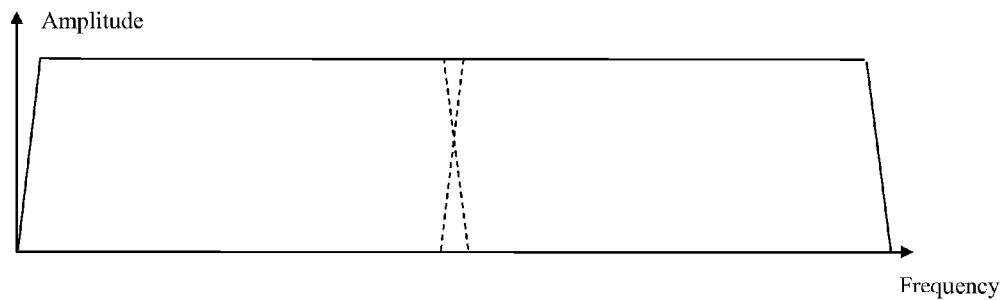

FIG. 6 shows the sum of the outputs of the complementary digital filters.

Figure 1:
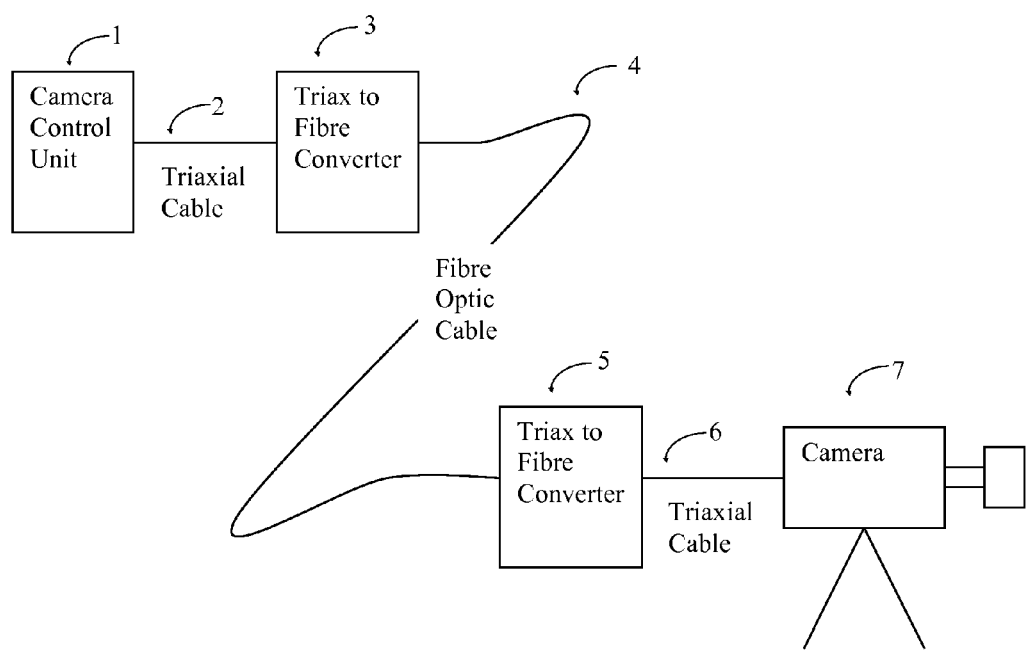
FIG. 1 is schematic view of the preferred embodiment of the present invention used with a television camera.

In the schematic view of FIG. 1 a television camera 7 is connected to a remote camera control unit (CCU) 1 via an installation according to the present invention.

A first triaxial cable 2 connects CCU 1 with an interface 3. The interface 3 comprises a first adapter converting electrical signals, conveyed by the triaxial cable 3, to optical signals. A fibre optic cable 4 transmits optical signals to a second interface 5. The interface 5 comprises a second adapter converting optical signals to electrical signals. A second triaxial cable 6 transmits the electrical signals to the television camera 7.

The electrical signals emitted by the camera 7 are transmitted by the second triaxial cable 6 to the second interface 5. The second interface 5 comprises a third adapter converting the electrical signals to optical signals. The third adapter is a mirror image of the first adapter located in interface 3. The optical signals emitted by the third adapter are transmitted by the fibre optic cable 4 to the interface 3. The interface 3 comprises a fourth adapter converting the received optical signals to electrical signals which are conveyed by the first triaxial cable 2 to the CCU 1. The fourth adapter is a mirror image of the second adapter located in interface 5. The first and third adapters and the second and fourth adapters may however be of different design but according to one of the claims.

Figure 2:
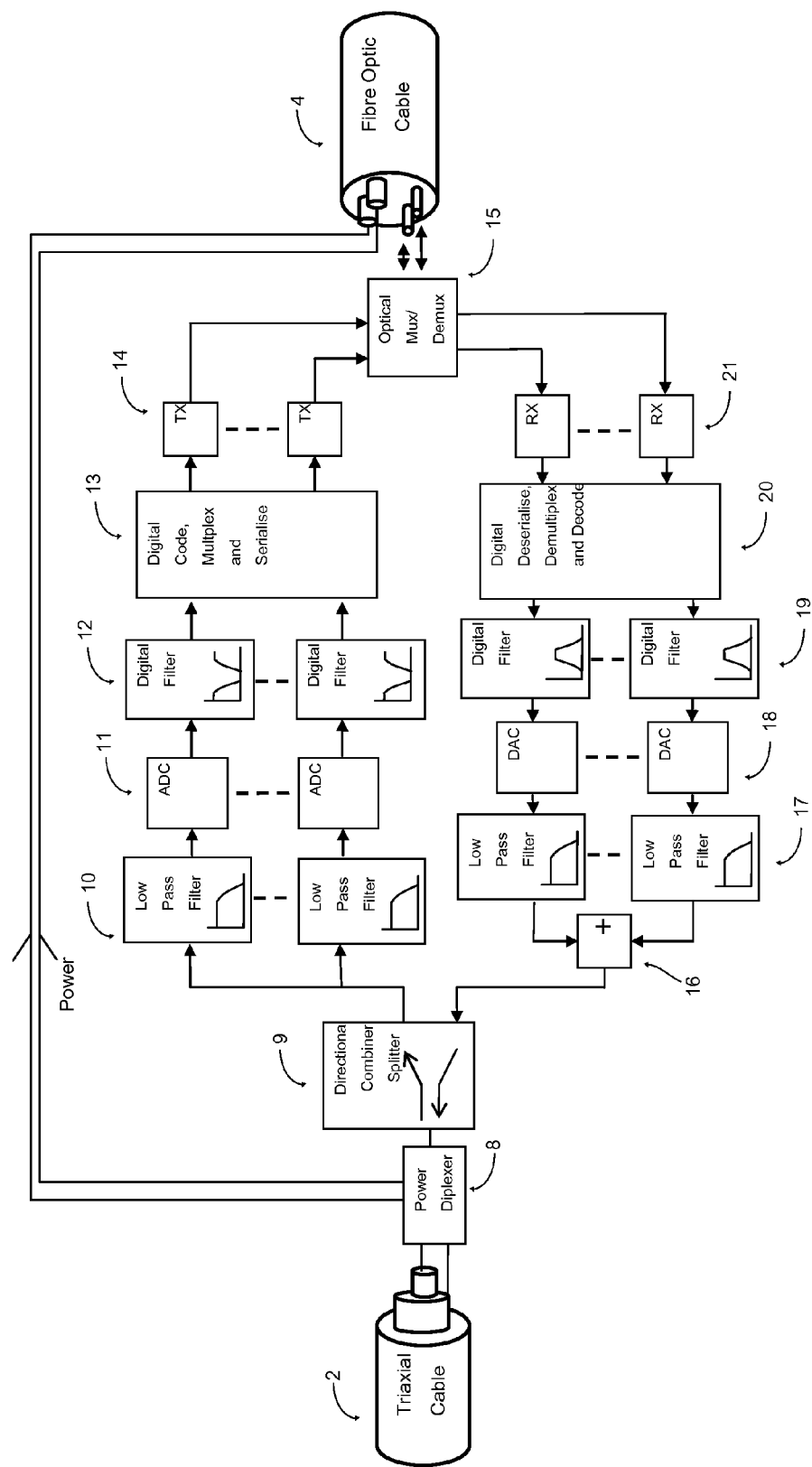
FIG. 2 shows a detailed view of the first interface and second interface according to the preferred embodiment of the invention.

The interface 3 comprising the first and fourth adapter shown in FIG. 2 will be now described.

In the preferred embodiment of the invention shown in FIG. 2, the triaxial cable 2 is connected to a power diplexer 8. The power diplexer 8 optionally allows DC or AC power to flow to conductors in a hybrid fibre optic cable 4 while the higher frequency electrical signals carried on the first triaxial cable 2 are fed to a directional splitter/combiner 9. The second adapter can also be provided with a power diplexer. In the first adapter the power diplexer conducts power from the triax to the hybrid fibre optic cable. In the second adapter the power diplexer conducts power from the copper conductors in the hybrid fibre optic cable to the triax.

The upper portion of interface 3 comprising low pass anti-alias filters 10, analogue to digital converters 11, digital filters 12, digital coding circuits 13, optical transducers (TX) 14, is the first adapter. The lower portion comprising summing circuit 16, low-pass filters 17, digital to analogue converters (DAC) 18, digital filters 19, digital decoding circuits 20, receive optical transducers (RX) 21, is the fourth adapter.

A direction combiner/splitter 9 feeds electrical signals from the first triaxial cable 2 to the low pass anti-alias filters 10 but does not allow signals from the digital to analogue converters (DAC) 18 to reach the low pass anti-alias filters 10. The low pass anti-alias filters 10 prevent aliasing in the analogue to digital conversion process. The digital representations of the electrical signals from the first triaxial cable 2 are fed to a digital processing block 13, comprising one or more digital coding circuits connected to one of the analogue to digital converter circuits 11. In the preferred embodiment this block is implemented in a programmable logic device. The individual streams, are multiplexed, have redundant coding applied and are then converted into serial streams to feed to the optical transducers (TX) 14. The optical transducers 14 convert the serial digital signals into an optical signal.

In another preferred embodiment a single optical transducer of sufficient bandwidth may be used. In the preferred embodiment, the optical outputs of the transducers 14 are combined in an optical multiplexing/demultiplexing device 15 which sums the optical outputs from different wavelength transducers.

The optical multiplexing/demultiplexing device 15 also receives optical signals from the optic fibre cable 4 and separates them. A preferred embodiment of the optical multiplexing/demultiplexing device 15 comprises directional couplers and wavelength discriminators.

The demultiplexed optical signals from the fibre optic cable 4 are fed to the optical transducers 21 which reproduce the serial digital signal. In the preferred embodiment these are fed to a digital processing block 20, comprising one or more digital decoding circuits, that deserialises, decodes and demultiplexes the data. In the preferred embodiment, the demultiplexed data is fed to digital filters 19 which define the operating frequency range of the ADCs 11 and DACs 18. In the present invention one or more digital filters 19 are used whose frequency responses are designed to pass frequencies where the directional combiner/splitter works well and frequencies corresponding to signals that are intended to travel from the third to the fourth adapter.

According to other embodiments of the invention, the digital filters 12 may be present either in the first adapter or in the third adapter or, like in the preferred embodiment, in both of them. Similarly, digital filters 19 may be present either in the second adapter or in the fourth adapter or, like in the preferred embodiment, in both of them.

In the preferred embodiment (FIG. 1) an interface 3 of the type shown in FIG. 2, an embodiment of which is described above, is connected to the camera control unit 1 by a first triaxial cable 2. The fibre optic cable 4 from the interface 3 is fed to a second similar interface 5 connected to the camera 7 by a second triaxial cable 6. In the preferred embodiment, the second interface 5 has the same configuration as the first interface 3. However, as previously mentioned, the configurations of the first and second interface may differ.

Figure 3:
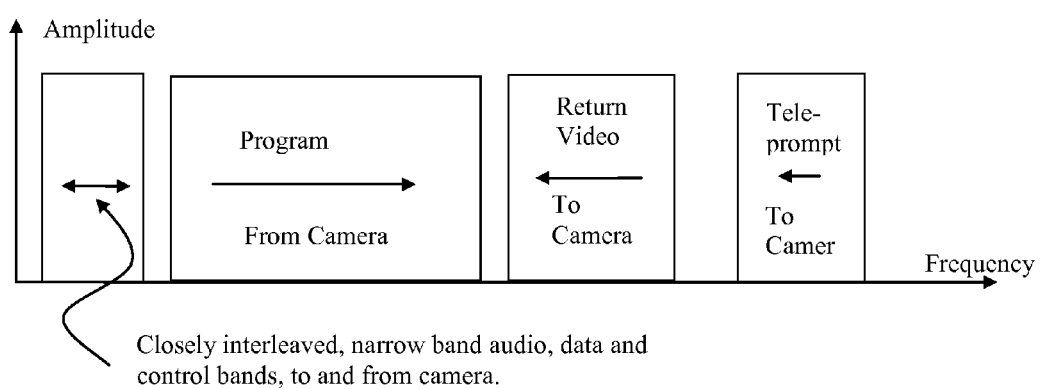
FIG. 3 shows a spectrum of signals on a typical triax link between a camera and a camera control unit

FIG. 3 shows a typical spectrum of the signals carried on a triax between a camera and a CCU. Signals transmitted in each direction are interleaved at different frequencies.

FIG. 4a shows the frequency response of one embodiment of the digital filters 19 in the path from the camera to CCU. It passes low frequencies at which the directional combiner/splitter work well. This has the advantage that neither individual filters nor demodulators are required for each of the many audio, data and control signals. It passes the program video band. It rejects the return and teleprompt bands which otherwise would result in faint echos, ghosts or ringing on the return video picture and teleprompt screen. In other terms, the digital filters 19 are configured to block or attenuate frequency ranges that correspond to frequency ranges of signals transmitted from the camera to the camera control unit and to pass frequency ranges that correspond to frequency ranges of signals transmitted from the camera control unit to the camera.

FIG. 4b shows the frequency response of the digital filters 12 used in the path from the CCU to the camera in the same embodiment of the present invention. It also passes low frequencies at which the directional combiner/splitter work well. It passes the return video and teleprompt bands. It rejects the program video band which otherwise would result in faint echos, ghosts or ringing on the program picture. In other terms, the digital filters 12 are configured to block or attenuate frequency ranges that correspond to frequency ranges of signals transmitted from the camera to the camera control unit and to pass frequency ranges that correspond to frequency ranges of signals transmitted from the camera control unit to the camera.

Another preferred embodiment of the invention uses one optical fibre for each of the optical transducers 14 and 21.

In the preferred embodiment of the invention, each of the digital to analogue converters 18 comprises a digital converter and a reconstruction filter.

The reconstructed analogue signals are summed by the summing circuit 16 and fed to the directional combiner/splitter 9. This feeds the summed electrical signal to the first triaxial cable 2 but not the low-pass anti-alias filters 10. The directional combiner/splitter performs well at low frequencies but works less well at higher frequencies.

If the camera control unit 1 provides power, it is fed via the first triaxial cable 2 and via the power diplexer 8 in the interface 3 near the control unit 1, via the conductors in an hybrid fibre optic cable 4 via the power diplexer 9 in the interface 5 near the camera 7, via the second triaxial cable 6 to the camera. In this case power supply for interface 5 and camera 7 is not necessary. Depending of the distance between the CCU and the camera, the interface 5 and camera 7 may be powered by conventional battery packs or similar to avoid power drop due to copper cable resistance.

The digital filters 12, 19 discriminate between signals of different frequencies. By blocking or attenuating the frequencies corresponding to signals in a given direction, the digital filter frequency response can be devised by an expert in the field to discriminate between the signals depending on their intended direction of travel to or from the camera. Digital filters are competitive on cost, size, weight and power when the signals travelling in each direction are grouped in one or more wide frequency bands reducing the complexity of the filters. This is typically true for the medium and higher frequency ranges. At low frequencies there are often many narrow band, closely spaced signals conveying audio, control, timing and data signals. Signals in each direction are often interleaved making digital filters a less optimal solution than the directional combiner/splitter.

By discriminating between frequency ranges containing multiple signals all travelling in the same direction, the filter complexity and hence size, weight, power and cost are reduced.

Moreover, digital filters are more reproducible giving greater consistency in performance from one unit to the next.

Digital filters are much more immune to drift due to temperature and ageing.

In the prior art, circuit boards or modules are often changed to allow the equipment to be used with a different camera (or a different family of cameras) because the signals carried are transmitted at different frequencies. It is well known to experts in the field that the frequency response of digital filters can be changed by reprogramming the filter coefficients. In an embodiment of the invention, the user plugs a device into a socket. A microprocessor communicates with a circuit in the device and identifies the camera type indicated by the device. The microprocessor then controls subcircuits that load the appropriate coefficients into the digital filters.

Limitations in the performance of ADCs and DACs may require the use of multiple channels for very high bandwidths. Splitting the frequency spectrum between channels can cause frequency ripple if a signal to be transmitted sits partly in each channel. This can be reduced by using complementary filters in the adjacent channels. A pair of filters is complementary if the sum of the response of the two adjacent filters is constant throughout the crossover region. FIG. 5 shows the responses of a pair of digital filters that have been designed to be complementary. When the output of the digital filters is combined in a summing circuit 16 the signal that was to be transmitted is reconstructed faithfully without any frequency ripple. The digital filters may be complementary within one or more frequency ranges as well as being designed to block or reject other frequency ranges to reduce or eliminate echoes.

The invention claimed is:

1. Installation for conveying electrical signals between a first triaxial cable connected to a camera control unit and a second triaxial cable connected to a camera, said installation comprising a first interface, configured to be connectable between the first triaxial cable and a fibre optic cable comprising one or more optical fibres, and a second interface, configured to be connectable between the fibre optic cable and the second triaxial cable, said first interface comprising a first and a fourth adapter, said second interface comprising a second and a third adapter,
said first and said third adapters comprising
a directional combiner/splitter,
one or more low pass anti-alias filters,
one or more analogue to digital converter circuits, each connected to one of the low pass anti-alias filters,
one or more digital coding circuits, each connected to one of the analogue to digital converter circuits,
one or more first optical transducers, each connected to the digital coding circuits,
said second and said fourth adapters comprising
one or more second optical transducers,
one or more digital decoding circuits, each connected to one of the second optical transducers—one or more digital to analogue converter circuits, each connected to one of the digital decoding circuits,
one or more low-pass filters, each connected to one of the digital to analogue converter circuit,
wherein
said first adapter comprises one or more first digital filters, each connected between one of the analogue to digital converter circuits and one of the digital coding circuits, said first digital filters being configured to block or attenuate frequency ranges that correspond to frequency ranges of signals transmitted from the camera to the camera control unit and to pass frequency ranges that correspond to frequency ranges of signals transmitted from the camera control unit to the camera,
or said second adapter comprises one or more second digital filters, each connected between one of the digital decoding circuits and one of the digital to analogue converter circuits, said second digital filters being configured to block or attenuate frequency ranges that correspond to frequency ranges of signals transmitted from the camera to the camera control unit and to pass frequency ranges that correspond to frequency ranges of signals transmitted from the camera control unit to the camera,
or said third adapter comprises one or more third digital filters, each connected between one of the analogue to digital converter circuits and one of the digital coding circuits, said third digital filters being configured to block or attenuate frequency ranges that correspond to frequency ranges of signals transmitted from the camera control unit to the camera and to pass frequency ranges that correspond to frequency ranges of signals transmitted from the camera to the camera control unit,
or said fourth adapter comprises one or more fourth digital filters, each connected between one of the digital decoding circuits and one of the digital to analogue converter circuits, said fourth digital filters being configured to block or attenuate frequency ranges that correspond to frequency ranges of signals transmitted from the camera control unit to the camera and to pass frequency ranges that correspond to frequency ranges of signals transmitted from the camera to the camera control unit.

2. Installation according to claim 1, wherein the second and the fourth adapter comprise a summing circuit connected to the low-pass filters.

3. Installation according to claim 1, wherein the first and the third adapters comprise an optical combiner to sum optical signals output by the first optical transducers.

4. Installation according to claim 1, wherein the second and the fourth adapters comprise a wavelength division multiplexer able to split a combined optical signal into several independent optical signals to be transmitted by the second optical transducers.

5. Installation according to claim 1, wherein the first and second adapters are each provided with a power diplexer.

6. Installation according to claim 1, wherein the first and fourth adapters respectively the second and the third adapters comprise a wavelength division multiplexer or directional coupler.

7. Installation according to claim 1, wherein the first and fourth adapters respectively the second and the third adapters are enclosed in two different housings provided with input and output ends connectable to the triaxial and fibre optic cables.

8. Installation according to claim 1, wherein the characteristics of the first, second, third and fourth digital filters are adjustable.

* * * * *